(12) United States Patent
Fakoorian et al.

(10) Patent No.: US 11,882,083 B2
(45) Date of Patent: Jan. 23, 2024

(54) UPLINK SHARED CHANNEL REPETITION FOR ULTRA-RELIABLE LOW LATENCY COMMUNICATIONS

(71) Applicant: QUALCOMM Incorporated, San Diego, CA (US)

(72) Inventors: Seyed Ali Akbar Fakoorian, San Diego, CA (US); Seyedkianoush Hosseini, San Diego, CA (US); Wei Yang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/803,458

(22) Filed: Feb. 27, 2020

(65) Prior Publication Data
US 2020/0314875 A1  Oct. 1, 2020

Related U.S. Application Data

(60) Provisional application No. 62/826,811, filed on Mar. 29, 2019, provisional application No. 62/868,812, filed on Jun. 28, 2019.

(51) Int. Cl.
*H04W 72/1263* (2023.01)
*H04L 5/14* (2006.01)
(Continued)

(52) U.S. Cl.
CPC ........ *H04L 5/1469* (2013.01); *H04J 13/0062* (2013.01); *H04L 1/1819* (2013.01);
(Continued)

(58) Field of Classification Search
CPC ............ H04W 72/1263; H04W 72/042; H04L 25/0226; H04L 5/0055; H04L 1/1819;
(Continued)

(56) References Cited

U.S. PATENT DOCUMENTS

2018/0132210 A1\* 5/2018 Rico Alvarino .... H04W 72/042
2018/0220415 A1   8/2018 Yin et al.
(Continued)

FOREIGN PATENT DOCUMENTS

WO   WO-2014005773 A1   1/2014
WO   WO-2018062976 A1   4/2018
(Continued)

OTHER PUBLICATIONS

Nokia, et al., "Summary of Friday Offline Discussion on Potential Enhancements for PUSCH for NR URLLC (AI 7.2.6.1.3)", 3GPP Draft, 3GPP TSG-RAN WG1 Meeting #96, R1-1903797, 3rd Generation Partnership Project (3GPP), Mar. 3, 2019 (Year: 2019).\*
(Continued)

*Primary Examiner* — Thinh D Tran
(74) *Attorney, Agent, or Firm* — Sevan Savsa; Harrity & Harrity, LLP

(57) ABSTRACT

Various aspects of the present disclosure generally relate to wireless communication. In some aspects, a user equipment (UE) may map an ultra-reliable low-latency communication (URLLC) transmission to a set of symbols for uplink transmission, wherein the mapping relates to at least one of an orphaned symbol repetition of the URLLC transmission, a transport block size determination, a shared channel mapping type of a repetition of the URLLC transmission, or a priority of an aperiodic sounding reference signal (A-SRS) of the URLLC transmission. The UE may transmit the URLLC transmission based at least in part on the mapping. Numerous other aspects are provided.

30 Claims, 5 Drawing Sheets

(51) Int. Cl.

| | |
|---|---|
| H04L 27/26 | (2006.01) |
| H04L 25/02 | (2006.01) |
| H04L 1/1812 | (2023.01) |
| H04L 5/00 | (2006.01) |
| H04J 13/00 | (2011.01) |
| H04L 5/10 | (2006.01) |
| H04W 72/23 | (2023.01) |
| H04L 1/1867 | (2023.01) |

(52) U.S. Cl.
CPC .......... H04L 5/0051 (2013.01); H04L 5/0055 (2013.01); H04L 5/10 (2013.01); H04L 25/0226 (2013.01); H04L 27/2602 (2013.01); H04L 27/2636 (2013.01); H04W 72/1263 (2013.01); H04W 72/23 (2023.01); *H04L 1/1893* (2013.01); *H04L 27/261* (2013.01)

(58) Field of Classification Search
CPC ..... H04L 5/10; H04L 5/0051; H04L 27/2636; H04L 1/189; H04L 1/1893; H04L 27/261; H04L 27/2602; H04L 5/1469; H04J 13/0062
See application file for complete search history.

(56) References Cited

U.S. PATENT DOCUMENTS

| | | | | |
|---|---|---|---|---|
| 2018/0324872 | A1* | 11/2018 | Babaei | H04L 5/0053 |
| 2019/0149365 | A1* | 5/2019 | Chatterjee | H04L 25/0226 370/329 |
| 2019/0246420 | A1* | 8/2019 | Park | H04W 72/087 |
| 2019/0268120 | A1* | 8/2019 | Gao | H04L 5/0051 |
| 2019/0274172 | A1* | 9/2019 | Yoon | H04W 74/0866 |
| 2019/0281621 | A1* | 9/2019 | Noh | H04L 5/00 |
| 2020/0044789 | A1* | 2/2020 | Beale | H04L 25/0224 |
| 2020/0052828 | A1* | 2/2020 | Wang | H04L 1/188 |
| 2020/0107300 | A1* | 4/2020 | Kwak | H04W 72/042 |
| 2020/0288463 | A1* | 9/2020 | Lee | H04W 72/1242 |
| 2020/0313793 | A1* | 10/2020 | Jung | H04L 1/08 |
| 2022/0131652 | A1* | 4/2022 | Bae | H04L 5/1469 |
| 2022/0132533 | A1* | 4/2022 | Taherzadeh Boroujeni | H04L 5/0094 |

FOREIGN PATENT DOCUMENTS

| | | |
|---|---|---|
| WO | WO-2018097680 A1 | 5/2018 |
| WO | WO-2018128501 A1 | 7/2018 |
| WO | WO-2018212628 A1 | 11/2018 |
| WO | 2020145773 A1 | 7/2020 |

OTHER PUBLICATIONS

Jung et al., "Method and Apparatus for Communication on a Wireless Network", U.S. Appl. No. 62/823,491, filed Mar. 25, 2019 (Year: 2019).*

Le et al., "An Overview of Physical Layer Design for Ultra-Reliable Low-Latency Communications in 3GPP Releases 15, 16, and 17", published on Dec. 23, 2020 (Year: 2020).*

ETSI TS 138 214 V16.2.0 (Jul. 2020) ("5G; NR; Physical layer procedures for data (3GPP TS 38.214 version 16.2.0 Release 16)") (Year: 2020).*

CMCC, "Discussion on mapping type B PUSCH repetition", 3GPP TSG RAN WG1 Meeting #92bis R1-1804103, published on Apr. 16-20, 2018 (Year: 2018).*

Taherzadeh Boroujeni et al., "Physical uplink shared channel transmissions", U.S. Appl. No. 62/805,046, filed Feb. 13, 2019 (Year: 2019).*

Taherzadeh Boroujeni et al., "Physical Uplink Shared Channel Transmissions", the U.S. Appl. No. 62/805,046, filed Feb. 13, 2019 (Year: 2019).*

Nokia, Nokia Shanghai Bell, "On PUSCH enhancements for NR URLLC", 3GPP TSG RAN WG1 Meeting #97, R1-1906755, May 13-17, 2019 (Year: 2019).*

Nokia, Nokia Shanghai Bell, "On PUSCH enhancements for NR URLLC", 3GPP TSG RAN WG1#96, R1-1901915, Feb. 25-Mar. 1, 2019 (Year: 2019).*

Nokia, Nokia Shanghai Bell, "Summary of Thursday offline discussion on PUSCH enhancements for NR eURLLC (AI 7.2.6.3)", 3GPP TSG-RAN WG1 Meeting #97, R1-1907861, May 13-17, 2019 (Year: 2019).*

International Search Report and Written Opinion—PCT/US2020/020461—ISAEPO—Jul. 22, 2020.

Nokia, et al., "Summary of Friday Offline Discussion on Potential Enhancements for PUSCH for NR URLLC (AI 7.2.6.1.3)", 3GPP Draft, 3GPP TSG-RAN WG1 Meeting #96, R1-1903797, Summary of Friday Offline Discussion on 7.2.6.1.3 URLLC PUSCH ENH, 3rd Generation Partnership Project (3GPP), Mobile Competence Centre, 650, Route Des Lucioles, F-06921 Sophia, vol. RAN WG1, No. Athens, Greece, Feb. 25-Mar. 1, 2019, Mar. 3, 2019 (Mar. 3, 2019), XP051691042, 39 pages, Retrieved from the Internet: URL: http://www.3gpp.org/ftp/tsg%5Fran/WG1%5FRL1/TSGR1%5F96/Docs/R1%2D1903797%2Ezip. [retrieved on Mar. 3, 2019] paragraph [02.1]—paragraph [02.4].

Partial International Search Report—PCT/US2020/020461—ISA/EPO—May 20, 2020.

Vivo: "PUSCH Enhancements for URLLC", 3GPP TSG RAN WG1 #96, R1-1901694 Athens, Greece, Feb. 25-Mar. 1, 2019, pp. 1-10.

ZTE: "Grant-Based PUSCH Enhancements for URLLC", 3GPP Draft, 3GPP TSG RAN WG1 #96, R1-1901769, Grant-based PUSCH Enhancements for URLLC, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25-Mar. 1, 2019, Feb. 16, 2019 (Feb. 16, 2019), XP051599463, 8 pages, Retrieved from the Internet: URL: http://www.3gpp.org/ftp/tsg%5Fran/WG1%5FRL1/TSGR1%5F96/Docs/R1%2D1901769%2Ezip. [retrieved on Feb. 16, 2019] the whole document.

Taiwan Search Report—TW109106686—TIPO—dated Nov. 18, 2023.

* cited by examiner

UPLINK SHARED CHANNEL REPETITION FOR ULTRA-RELIABLE LOW LATENCY COMMUNICATIONS

CROSS-REFERENCE TO RELATED APPLICATION

This Patent Application claims priority to U.S. Provisional Patent Application No. 62/826,811, filed on Mar. 29, 2019, entitled "UPLINK SHARED CHANNEL REPETITION FOR ULTRA-RELIABLE LOW LATENCY COMMUNICATIONS," and U.S. Provisional Patent Application No. 62/868,812, filed on Jun. 28, 2019, entitled "UPLINK SHARED CHANNEL REPETITION FOR ULTRA-RELIABLE LOW LATENCY COMMUNICATIONS," both of which are assigned to the assignee hereof. The disclosure of the prior Applications is considered part of and is incorporated by reference in this Patent Application.

FIELD OF THE DISCLOSURE

Aspects of the present disclosure generally relate to wireless communication, and to techniques and apparatuses for uplink shared channel repetition for ultra-reliable low latency communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include mapping an ultra-reliable low-latency communication (URLLC) transmission to a set of symbols for uplink transmission, wherein the mapping relates to at least one of: an orphaned symbol repetition of the URLLC transmission, a transport block size determination, a shared channel mapping type of a repetition of the URLLC transmission, or a priority of an aperiodic sounding reference signal (A-SRS) of the URLLC transmission; and transmitting the URLLC transmission based at least in part on the mapping.

In some aspects, a UE for wireless communication may include memory and one or more processors operatively coupled to the memory. The memory and the one or more processors may be configured to map a URLLC transmission to a set of symbols for uplink transmission, wherein the mapping relates to at least one of: an orphaned symbol repetition of the URLLC transmission, a transport block size determination, a shared channel mapping type of a repetition of the URLLC transmission, or a priority of an A-SRS of the URLLC transmission; and transmit the URLLC transmission based at least in part on the mapping.

In some aspects, a non-transitory computer-readable medium may store one or more instructions for wireless communication. The one or more instructions, when executed by one or more processors of a UE, may cause the one or more processors to: map a URLLC transmission to a set of symbols for uplink transmission, wherein the mapping relates to at least one of: an orphaned symbol repetition of the URLLC transmission, a transport block size determination, a shared channel mapping type of a repetition of the URLLC transmission, or a priority of an A-SRS of the URLLC transmission; and transmit the URLLC transmission based at least in part on the mapping.

In some aspects, an apparatus for wireless communication may include means for mapping a URLLC transmission to a set of symbols for uplink transmission, wherein the mapping relates to at least one of: an orphaned symbol repetition of the URLLC transmission, a transport block size determination, a shared channel mapping type of a repetition of the URLLC transmission, or a priority of an A-SRS of the URLLC transmission; and means for transmitting the URLLC transmission based at least in part on the mapping.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
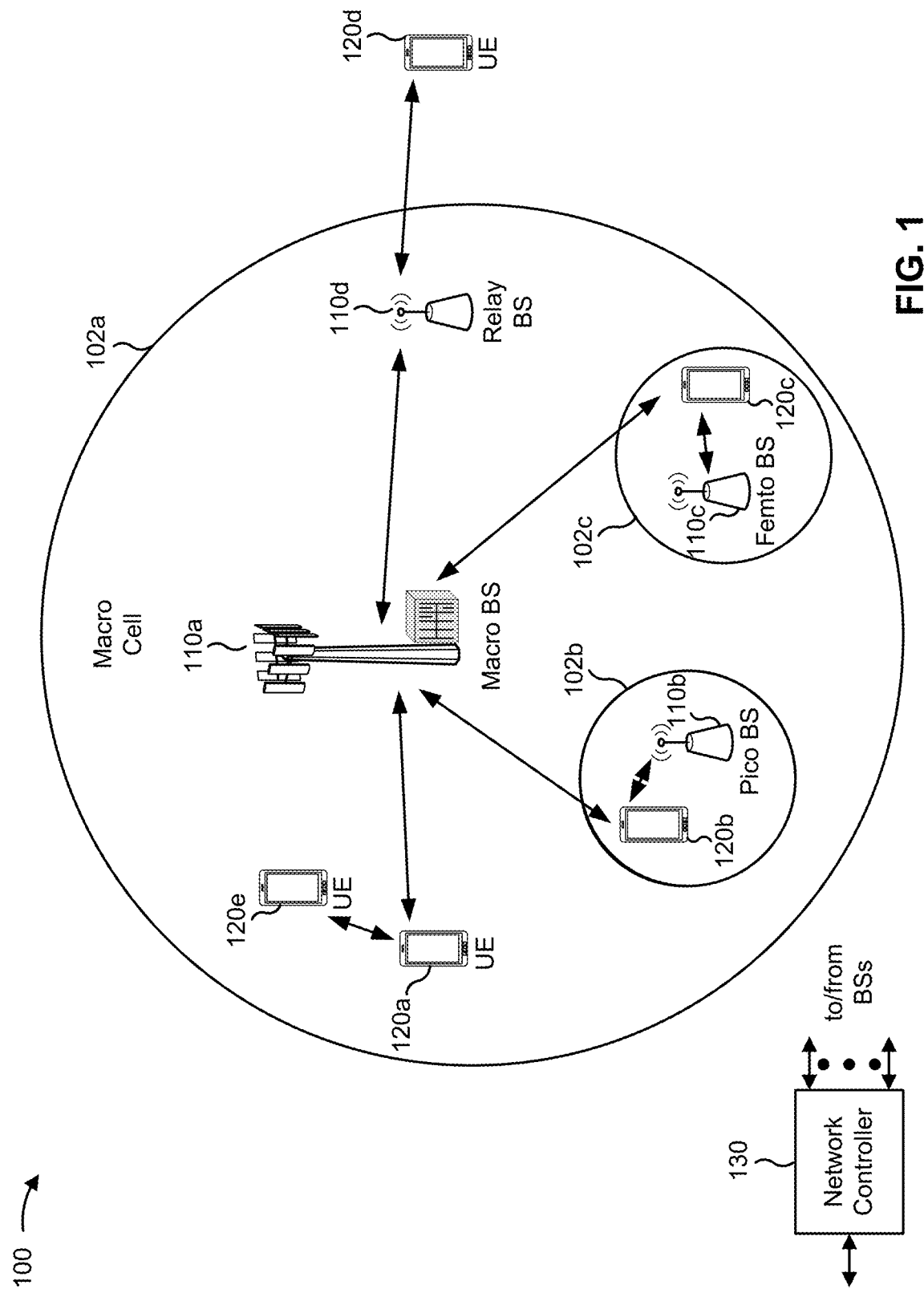
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
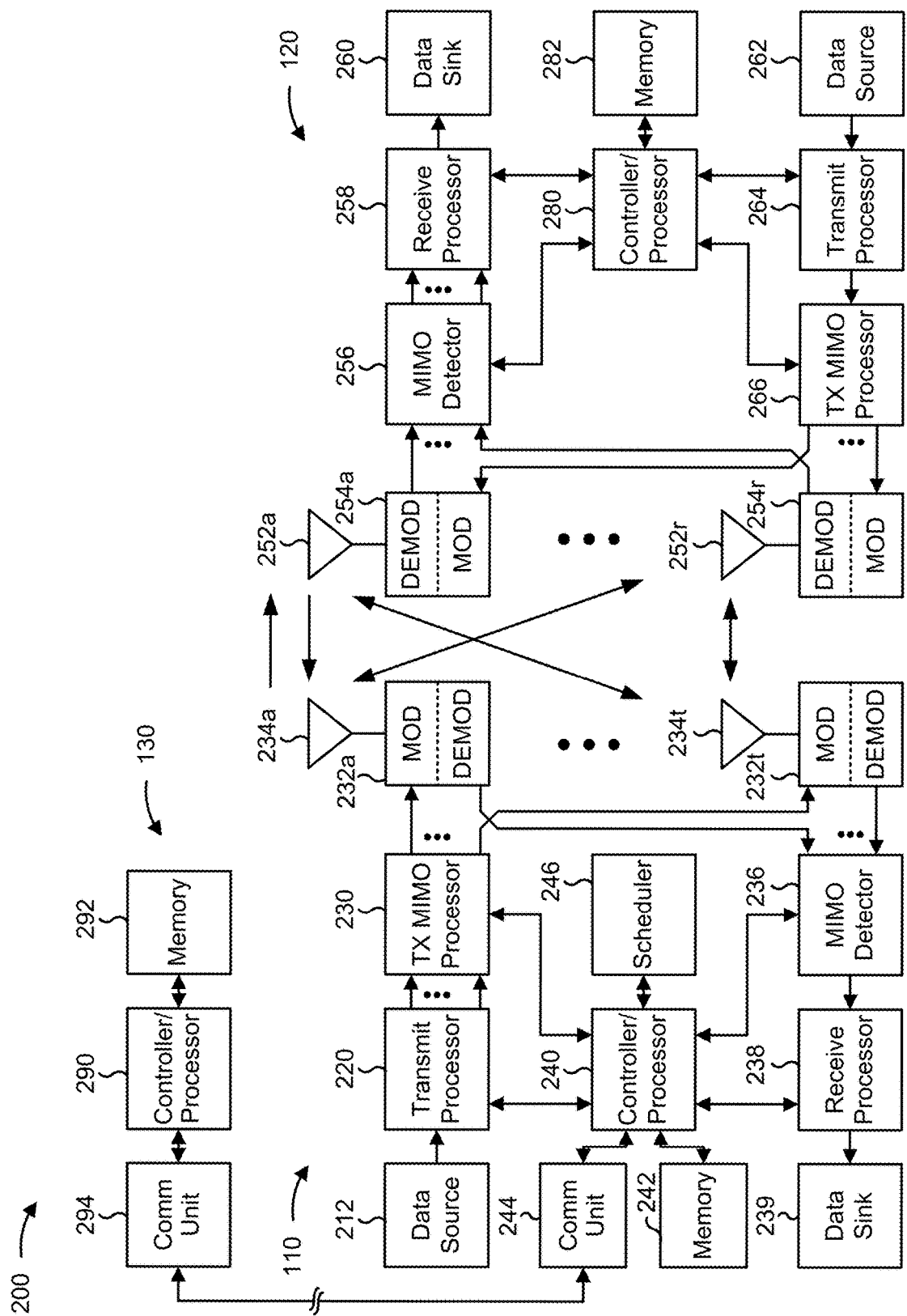
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with uplink shared channel repetition for ultra-reliable low latency communications, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for mapping a URLLC transmission to a set of symbols for uplink transmission, wherein the mapping relates to at least one of an orphaned symbol repetition of the URLLC transmission, a transport block size determination, a shared channel mapping type of a repetition of the URLLC transmission, or a priority of an A-SRS of the URLLC transmission; means for transmitting the URLLC transmission based at least in part on the mapping; means for dropping or postponing the orphaned symbol repetition; means for transmitting a control channel when the control channel is associated with a URLLC service; means for dropping or postponing a control channel in a symbol to which the orphaned symbol repetition is to be mapped when the control channel is related to a best-effort service and the orphaned symbol repetition is associated with a URLLC service; means for receiving or determining an indication of whether one or more orphaned symbols associated with the orphaned symbol repetition are to be used for the URLLC transmission; means for mapping at least one of a previous repetition or a next repetition, relative to the orphaned symbol repetition, to the one or more orphaned symbols; means for mapping the orphaned symbol repetition to the one or more orphaned symbols; means for determining whether the one or more orphaned symbols are to be used for the URLLC transmission based at least in part on whether the one or more orphaned symbols overlap a reference signal transmission section of the slot; and/or the like. In some aspects, such means may include one or more components of UE 120 described in connection with FIG. 2.

As indicated above, FIG. 2 is provided as an example. Other examples may differ from what is described with regard to FIG. 2.

A BS may schedule an ultra-reliable low-latency communication (URLLC) transmission to be performed by a UE. The URLLC transmission may include a physical uplink shared channel (PUSCH), an aperiodic sounding reference signal (A-SRS), a demodulation reference signal (DMRS), and/or the like. In some aspects, the URLLC transmission may be performed using multiple repetitions, which may improve reliability of the URLLC transmission. In the interest of satisfying the stringent latency requirements of the URLLC service, the BS may schedule the repetitions to be performed consecutively. For example, a second repetition may start at an end of a first repetition, rather than necessarily being delayed to a next slot. This may reduce latency associated with the URLLC transmission.

One or more approaches for scheduling the URLLC transmission may be supported. For example, one or more actual PUSCH repetitions in one slot, and/or two or more PUSCH repetitions across a slot boundary in consecutive available slots, may be supported using one uplink (UL) grant for a dynamic PUSCH or one configured grant configuration for a configured grant PUSCH. In a first approach, the number of repetitions signaled by the BS may represent a "nominal" number of repetitions. The actual number of repetitions can be larger than the nominal number of repetitions. The actual number of repetitions may be based at least in part on a slot boundary, a number or location of uplink-only symbols, a number or location of special symbols, and/or the like. A time domain resource assignment (TDRA) field in downlink control information (DCI) of the UL grant, or a TDRA parameter in a Type 1 configured grant, may indicate a resource for the first nominal repetition. The time domain resources for the remaining repetitions may be derived based at least in part on the resources for the first repetition and the UL/DL direction of the symbols. In a second approach, the number of repetitions, starting symbols of each repetition, length of each repetition, and mapping of the repetitions to slots can be obtained from each entry in the TDRA table.

If a nominal repetition goes across the slot boundary or the DL/UL switching point, this nominal repetition may be split into multiple PUSCH repetitions, with one PUSCH repetition in each UL period in a slot. Certain challenges may arise in the splitting of the nominal repetition. For example, in some cases, a small repetition may be scheduled (e.g., one symbol, two symbols, and/or the like), which may lead to high coding rates, challenges with scheduling DMRS, and/or the like. Such a small repetition may be referred to herein as an orphaned symbol repetition, and the one or more symbols used for an orphaned symbol repetition may be referred to as orphaned symbols. For an example of an orphaned symbol repetition, refer to FIG. 5, described below. As another example, DMRS may not be shared across multiple PUSCH repetitions since DMRS is ideally transmitted within a resource allocation of a corresponding communication. As a third example, it may be challenging to determine a transport block size (TBS) in the case of the nominal repetition. As a fourth example, an A-SRS may conflict with another transmission, particularly when the A-SRS is associated with a URLLC service and the other transmission is associated with a best-effort service (e.g., an eMBB service and/or the like).

Some techniques and apparatuses described herein provide mapping approaches for orphaned symbol repetitions and/or orphaned symbols of URLLC transmissions, TBS determination, shared channel mapping types (e.g., how to map DMRS for URLLC transmissions), priority determination for A-SRS, and/or the like. Thus, efficiency and consistency of consecutive repetitions of URLLC transmissions may be improved, thereby enabling low-latency and ultra-reliable communications.

Figure 3:
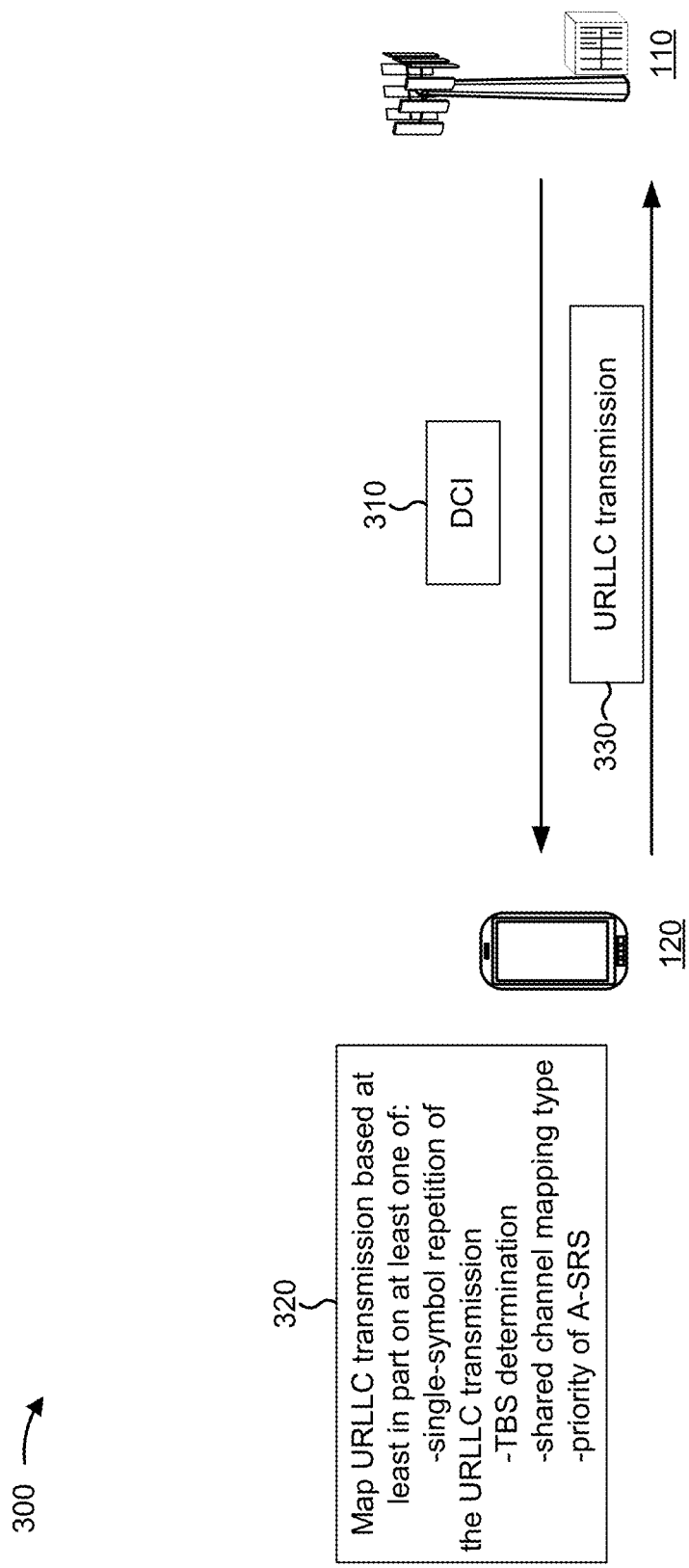
FIG. 3 is a diagram illustrating an example of mapping for an ultra-reliable low-latency communication (URLLC) transmission, in accordance with various aspects of the present disclosure.

FIG. 3 is a diagram illustrating an example 300 of mapping for a URLLC transmission, in accordance with various aspects of the present disclosure. As shown, example 300 includes a UE (e.g., UE 120) and a BS (e.g., BS 110).

As shown in FIG. 3, and by reference number 310, the BS may provide DCI to the UE. The DCI may schedule a URLLC transmission that is associated with multiple repetitions. In some aspects, the DCI may schedule a starting symbol of a first repetition, a length of each repetition, and a number of repetitions. In some aspects, the DCI may schedule (e.g., explicitly identify) a number of repetitions, a starting symbol of each repetition, a length of each repetition, and a mapping of repetitions to slots. In some aspects, the DCI may implicitly identify a number of repetitions, a starting symbol of each repetition, a length of each repetition, and a mapping of repetitions to slots by identifying an entry in a TDRA table, which may indicate the above information.

As shown by reference number 320, the UE may map a URLLC transmission based at least in part on the DCI. For example, the UE may map repetitions of the URLLC transmission to uplink symbols of one or more slots. In some aspects, the UE may map an orphaned symbol repetition of the URLLC transmission (e.g., due to a slot boundary, a UL symbol, a special symbol, and/or the like). In some aspects, the UE may determine a TBS of one or more repetitions of the URLLC transmission. In some aspects, the UE may determine a shared channel mapping type for one or more repetitions. In some aspects, the UE may determine a priority of an A-SRS and/or may map the A-SRS based at least in part on the priority. Each is described in turn below.

Figure 5:
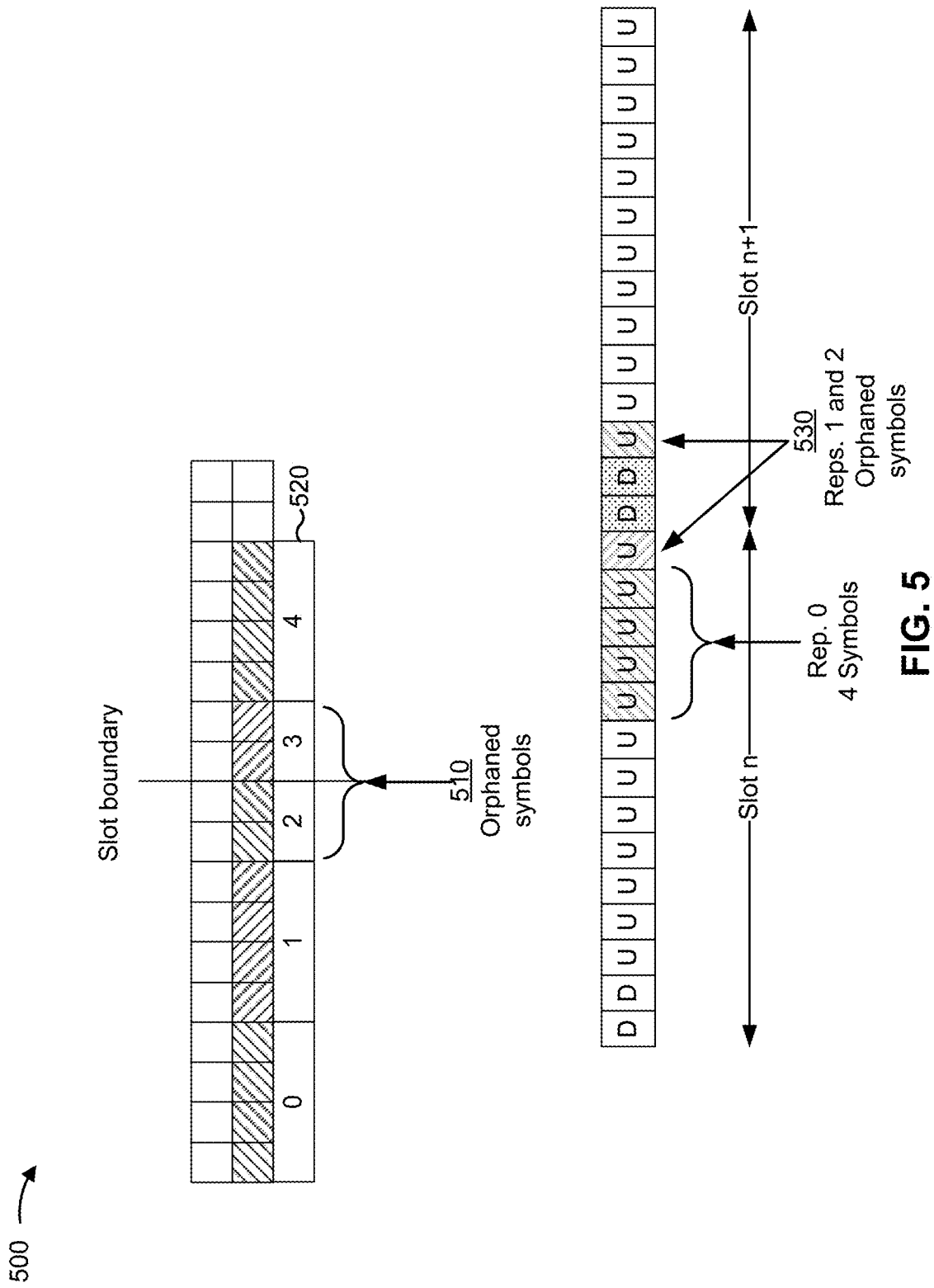
FIG. 5 is a diagram illustrating an example of an orphaned symbol repetition, in accordance with various aspects of the present disclosure.

In some aspects, due to orphaned symbols in a slot boundary and DL/UL symbol directions, a nominal repetition may be split over two or more actual repetitions, each with a one-symbol or two-symbol duration. This is shown in FIG. 5. In some cases, a PUSCH over an orphaned symbol transmission may be supported only with Type B mapping (e.g., with a DMRS at a first set of symbols (e.g., a first one or more symbols) of the orphaned symbol transmission). In this case, the DMRS and data to be transmitted in the orphaned-symbol transmission may be frequency division multiplexed. In some aspects, a PUSCH repetition over a small duration (e.g., one symbol, two symbols, and/or the like) is supported. In the case of an orphaned symbol duration, and when OFDM is used, in some aspects, repetition may be supported. In some aspects, in this case, repetition may be postponed (e.g., to a next available slot or resource allocation). In some aspects, when discrete Fourier transform spread OFDM (DFT-s-OFDM) transform precoding is used, an orphaned symbol repetition may be dropped or may be postponed.

In some aspects, the UE 120 may receive or determine an indication of whether an orphaned symbol is to be used for PUSCH transmission (e.g., URLLC transmission). The indication may be provided semi-statically (e.g., using a radio resource control signal), dynamically (e.g., using downlink control information), and/or the like. For example, the UE 120 may receive the indication from the BS 110, or may determine the indication based at least in part on a structure of an orphaned symbol repetition.

In some aspects, an orphaned symbol may correspond to a short (e.g., 1 or 2 symbols) PUSCH repetition occasion. In some aspects, an orphaned symbol may be a symbol of a PUSCH repetition occasion that results in a code rate that satisfies a threshold. For example, the threshold may be based at least in part on a nominal code rate of a first repetition of the PUSCH transmission. As one example, the threshold may be defined as 0.9 (e.g., if the code rate of the repetition is greater than 0.9, then one or more symbols of the repetition may be considered as orphaned symbols). In some aspects, the UE 120 may receive information explicitly identifying an orphaned symbol (e.g., from the BS 110 and/or the like).

In some aspects, the UE 120 determine whether to use orphaned symbols for a URLLC communication, such as a PUSCH transmission. For example, the UE 120 may determine that an orphaned symbol is not to be used for PUSCH transmission if the orphaned symbol overlaps a reference signal transmission section of a slot (e.g., a last X symbols of the slot, where X is an integer, a section of the slot in which a sounding reference signal (SRS) may be transmitted, and/or the like). If the orphaned symbol does not overlap the reference signal transmission section of the slot, the UE 120 may use the orphaned symbol for a PUSCH repetition.

In some aspects, the UE 120 may transmit another uplink channel, other than the PUSCH transmission, on an orphaned symbol. For example, the UE 120 transmit an SRS, a physical uplink control channel (PUCCH), and/or the like, on such an orphaned symbol.

In some aspects, when an orphaned symbol is used for a PUSCH transmission, the orphaned symbol may be added to a previous PUSCH repetition or a next PUSCH repetition in the case when the orphaned symbol is contiguous with the previous PUSCH repetition or the next PUSCH repetition. If the orphaned symbol is not contiguous with the previous PUSCH repetition or the next PUSCH repetition, the orphaned symbol may be used for an independent PUSCH repetition.

In some aspects, a physical uplink control channel (PUCCH) may overlap with a PUSCH. In this case, uplink control information (UCI) piggybacking on the PUSCH may be supported. This may be helpful, for example, in the case of hybrid automatic repeat request (HARQ) feedback, such as a HARQ acknowledgment (ACK) or a HARQ negative ACK (NACK), although the techniques and apparatuses described herein are not limited to those involving HARQ ACK/NACK feedback. In some aspects, the UE may multiplex only HARQ-ACK into a DMRS of the PUSCH, and may drop remaining UCI bits of the PUCCH, which may reduce interruption of the PUSCH. In such a case, the UE may use a Zadoff-Chu based DMRS sequence with N (e.g., 8) cyclic shifts applied to a sequence. This may provide for the mapping of up to $\log_2(N)$ HARQ information bits to the DMRS. Additionally, or alternatively, the UE may use a pseudo-noise based DMRS sequence. In either of the above cases, the UE may map information bits of the PUCCH using comb indices. For example, at a comb index of 4, 2 bits can be mapped into the DMRS. In some aspects, the UE may drop or postpone an orphaned symbol PUSCH transmission or repetition, and may only transmit the PUCCH in the orphaned symbol PUSCH transmission's symbol when the PUCCH is associated with a URLLC service. In some aspects, the UE may drop the PUCCH if the PUCCH is related to a best-effort service such as eMBB and the PUSCH is related to a URLLC service.

In some aspects, different PUSCH repetitions may have different durations or resource allocation. Thus, the UE may determine a TBS in connection with the mapping. In such a case, the UE may use parameters of a first segment given by the DCI (e.g., when each segment or repetition is explicitly scheduled), or may use parameters of a first nominal repetition given by the DCI (e.g., when only the first segment or repetition is explicitly scheduled). This may be particularly useful for dynamic grants, although this can be applied for other forms of grants. In some aspects, the UE may use the first actual resource after resolving the UL/DL interaction and/or slot boundary issues with mapping the URLLC communication (e.g., when each segment or repetition is explicitly scheduled or when only the first segment or repetition is explicitly scheduled). This may be particularly useful for configured grants, although this can be applied for other forms of grants.

In some aspects, the UE may determine a quantity and/or position of a DMRS symbol for one or more repetitions. For example, the UE may determine which PUSCH mapping type is to be used for the one or more repetitions. As used herein, mapping type A refers to a mapping wherein a DMRS is provided in the third or fourth symbol of a slot, and mapping type B refers to a mapping wherein a DMRS is provided in a resource allocation of a transmission (e.g., in the first symbol or in a different symbol). In some aspects, the DCI may indicate a PUSCH mapping type (e.g., mapping type A or mapping type B) for the first repetition or segment of a URLLC transmission. For example, mapping type A may be permitted only if the first repetition or segment starts at symbol 0 of a slot and the duration of the actual repetition is not less than 4 symbols. In some aspects, all repetitions after the first repetition may use mapping type B, which may improve demodulation performance of the other repetitions. In some aspects, all repetitions within a same slot as a first repetition may use mapping type B. In such a case, the first repetition of each slot, if any, may use mapping type A if one or more conditions are satisfied. For example, the conditions may include a first condition that DCI indicates mapping type A for the first repetition, a second condition that the first repetition in the slot is permitted to be mapping type A (e.g., that the first repetition starts from a first symbol of the slot, and that the length of the actual repetition is more than 3 symbols). In some aspects, all repetitions may be mapped using mapping type B. In this case, the corresponding radio resource control (RRC) information that identifies the mapping type can be ignored or removed, thus conserving UE and BS resources.

In some aspects, a UE may determine a priority for an A-SRS and/or whether the A-SRS should override a PUSCH transmission in a symbol. For example, in some legacy implementations, when the PUSCH and the SRS are to be transmitted in the same slot, the UE may only be permitted to transmit the SRS after the transmission of the PUSCH and the corresponding DMRS. However, in some cases, SRS may be needed for a higher-priority service (e.g., URLLC). In such a case, it may be beneficial for the SRS to cancel a lower priority (e.g., best-effort, eMBB, and/or the like) PUSCH.

In some aspects, an A-SRS for a URLLC service may cancel an eMBB PUSCH. For example, an A-SRS URLLC transmission may preempt or cancel an uplink shared channel associated with a best-effort service (e.g., in one or more conflicting symbols).

In some aspects, an A-SRS transmission may selectively preempt an uplink shared channel based at least in part on a priority of the A-SRS transmission. For example, the A-SRS priority can be explicitly indicated (e.g., via DCI, if physical-layer differentiation between eMBB and URLLC is supported). As another example, the A-SRS priority can be implicitly indicated (e.g., based at least in part on a timeline of the DCI). For example, if the DCI that triggers A-SRS is after DCI scheduling a best-effort PUSCH (e.g., an eMBB PUSCH), then the A-SRS may have a higher priority than the eMBB PUSCH. In these cases, the eMBB PUSCH may be cancelled or dropped only on the symbols colliding with the URLLC A-SRS.

As shown by reference number 330, the UE may transmit the URLLC transmission in accordance with the mapping. Thus, the UE may map the URLLC transmission to symbols of an uplink transmission, and may perform the transmission in accordance with URLLC requirements.

As indicated above, FIG. 3 is provided as an example. Other examples may differ from what is described with respect to FIG. 3.

Figure 4:
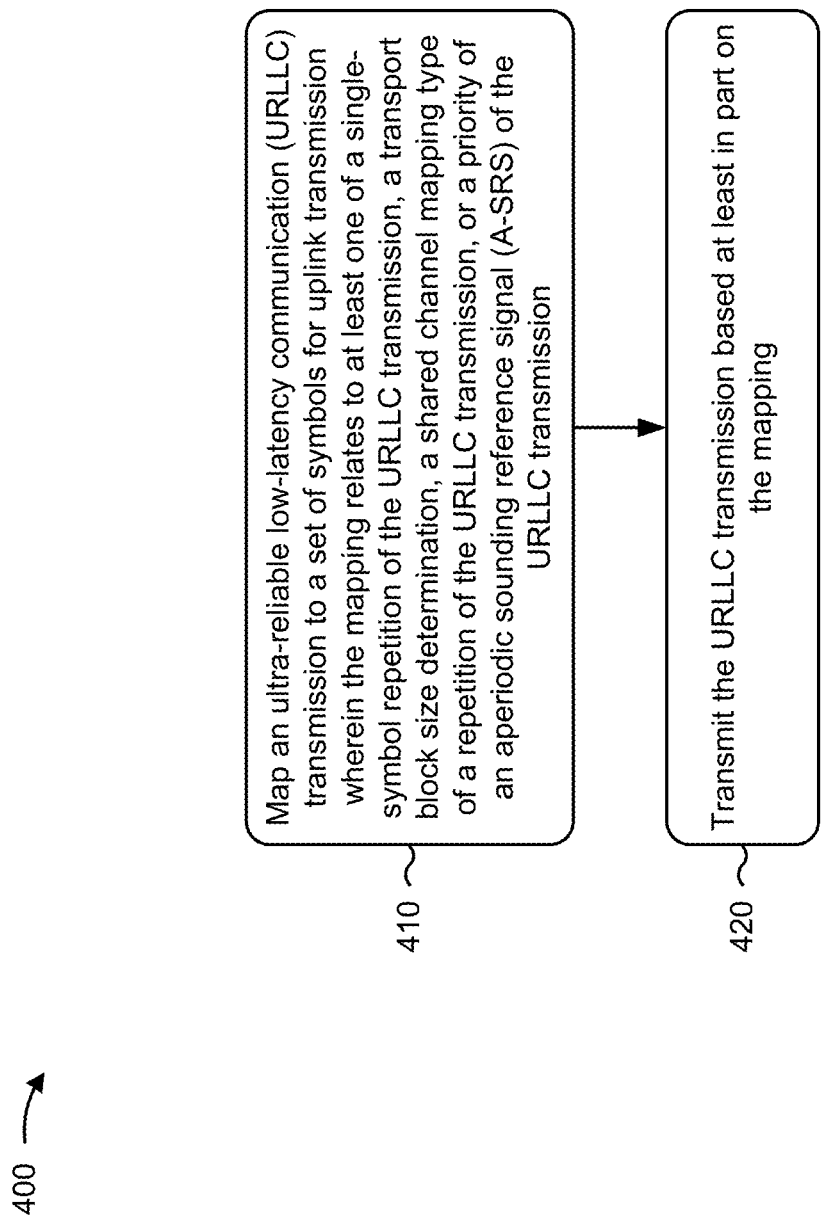
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120 and/or the like) performs operations associated with uplink shared channel repetition for ultra-reliable low latency communications.

As shown in FIG. 4, in some aspects, process 400 may include mapping an ultra-reliable low-latency communication (URLLC) transmission to a set of symbols for uplink transmission wherein the mapping relates to at least one of an orphaned symbol repetition of the URLLC transmission, a transport block size determination, a shared channel mapping type of a repetition of the URLLC transmission, or a priority of an aperiodic sounding reference signal (A-SRS) of the URLLC transmission (block 410). For example, the UE (e.g., using controller/processor 280, transmit processor 264, TX MIMO processor 266, MOD 254, antenna 252, and/or the like) may map an ultra-reliable low-latency communication (URLLC) transmission to a set of symbols for uplink transmission. The mapping may relate to at least one of an orphaned symbol repetition of the URLLC transmission, a transport block size determination, a shared channel mapping type of a repetition of the URLLC transmission, or a priority of an aperiodic sounding reference signal (A-SRS) of the URLLC transmission, as described above.

As further shown in FIG. 4, in some aspects, process 400 may include transmitting the URLLC transmission based at least in part on the mapping (block 420). For example, the UE (e.g., using controller/processor 280, transmit processor 264, TX MIMO processor 266, MOD 254, antenna 252, and/or the like) may transmit the URLLC transmission based at least in part on the mapping, as described above.

Process 400 may include additional aspects, such as any single implementation or any combination of aspects described below and/or in connection with one or more other processes described elsewhere herein.

In a first aspect, when the set of symbols is a set of orthogonal frequency division multiplexing (OFDM) symbols, mapping the URLLC transmission comprises mapping the orphaned symbol repetition to an OFDM symbol of the set of OFDM symbols.

In a second aspect, alone or in combination with the first aspect, when the set of symbols is a set of OFDM symbols, mapping the URLLC transmission comprises postponing the orphaned symbol repetition to an available transmission window.

In a third aspect, alone or in combination with the first aspect and/or the second aspect, when the set of symbols is a set of discrete Fourier transform spread orthogonal frequency division multiplexing (DFT-s-OFDM) symbols, mapping the URLLC transmission comprises postponing the orphaned symbol repetition to an available transmission window.

In a fourth aspect, alone or in combination with any one or more of the first through third aspects, when the set of symbols is a set of DFT-s-ODFM symbols, mapping the URLLC transmission comprises dropping the orphaned symbol repetition.

In a fifth aspect, alone or in combination with any one or more of the first through fourth aspects, a hybrid automatic repeat request (HARQ) acknowledgment (ACK) is multiplexed with a demodulation reference signal of the orphaned symbol repetition of the URLLC transmission.

In a sixth aspect, alone or in combination with any one or more of the first through fifth aspects, one or more other bits of uplink control information, other than the HARQ ACK, are dropped.

In a seventh aspect, alone or in combination with any one or more of the first through sixth aspects, a Zadoff-Chu sequence is used for the demodulation reference signal.

In an eighth aspect, alone or in combination with any one or more of the first through seventh aspects, a pseudo-noise sequence is used for the demodulation reference signal.

In a ninth aspect, alone or in combination with any one or more of the first through eighth aspects, the HARQ ACK is indicated using a comb index of the demodulation reference signal.

In a tenth aspect, alone or in combination with any one or more of the first through ninth aspects, mapping the URLLC transmission further comprises: dropping or postponing the orphaned symbol repetition; and transmitting a control channel when the control channel is associated with a URLLC service.

In an eleventh aspect, alone or in combination with any one or more of the first through tenth aspects, mapping the URLLC transmission further comprises: dropping or postponing a control channel in a symbol to which the orphaned symbol repetition is to be mapped when the control channel is related to a best-effort service and the orphaned symbol repetition is associated with a URLLC service.

In a twelfth aspect, alone or in combination with any one or more of the first through eleventh aspects, a nominal length or a first nominal repetition of the URLLC transmission is used to perform the transport block size determination.

In a thirteenth aspect, alone or in combination with any one or more of the first through twelfth aspects, a first actual resource or a first actual repetition is used to perform the transport block size determination.

In a fourteenth aspect, alone or in combination with any one or more of the first through thirteenth aspects, downlink control information for the URLLC transmission indicates the shared channel mapping type for a first repetition or a first segment of the URLLC transmission.

In a fifteenth aspect, alone or in combination with any one or more of the first through fourteenth aspects, one or more repetitions after a first repetition of the URLLC transmission are mapped with a demodulation reference symbol at a first set of symbols of the one or more repetitions.

In a sixteenth aspect, alone or in combination with any one or more of the first through fifteenth aspects, one or more repetitions after a first repetition of the URLLC transmission in a slot are mapped with a demodulation reference symbol at a first set of symbols of the one or more repetitions, and the first repetition of the URLLC transmission in the slot is mapped with a demodulation reference signal in a third or fourth symbol of the slot when a condition is satisfied.

In a seventeenth aspect, alone or in combination with any one or more of the first through sixteenth aspects, all repetitions of the URLLC transmission are mapped with a demodulation reference symbol at a first set of symbols of the one or more repetitions.

In an eighteenth aspect, alone or in combination with any one or more of the first through seventeenth aspects, the A-SRS preempts or cancels an uplink shared channel associated with a best-effort service.

In a nineteenth aspect, alone or in combination with any one or more of the first through eighteenth aspects, the A-SRS preempts or cancels the uplink shared channel in one or more conflicting symbols.

In a twentieth aspect, alone or in combination with any one or more of the first through nineteenth aspects, the priority of the A-SRS is explicitly indicated to the UE.

In a twenty-first aspect, alone or in combination with any one or more of the first through twentieth aspects, the priority of the A-SRS is implicitly indicated to the UE.

In a twenty-second aspect, alone or in combination with any one or more of the first through twenty-first aspects, the UE may receive or determine an indication of whether one or more orphaned symbols associated with the orphaned symbol repetition are to be used for the URLLC transmission.

In a twenty-third aspect, alone or in combination with any one or more of the first through twenty-second aspects, when the indication indicates that the one or more orphaned symbols are not to be used for the URLLC transmission, a transmission other than the URLLC transmission is performed on the one or more orphaned symbols.

In a twenty-fourth aspect, alone or in combination with any one or more of the first through twenty-third aspects, when the indication indicates that the one or more orphaned symbols are to be used for the URLLC transmission, mapping the URLLC transmission to the set of symbols further comprises mapping at least one of a previous repetition or a next repetition, relative to the orphaned symbol repetition, to the one or more orphaned symbols.

In a twenty-fifth aspect, alone or in combination with any one or more of the first through twenty-fourth aspects, when the indication indicates that the one or more orphaned symbols are to be used for the URLLC transmission, mapping the URLLC transmission to the set of symbols further comprises mapping the orphaned symbol repetition to the one or more orphaned symbols.

In a twenty-sixth aspect, alone or in combination with any one or more of the first through twenty-fifth aspects, receiving or determining an indication of whether one or more orphaned symbols associated with the orphaned symbol repetition are to be used for the URLLC transmission further comprises determining whether the one or more orphaned symbols are to be used for the URLLC transmission based at least in part on whether the one or more orphaned symbols overlap a reference signal transmission section of the slot.

In a twenty-seventh aspect, alone or in combination with any one or more of the first through twenty-sixth aspects, the indication of whether one or more orphaned symbols associated with the orphaned symbol repetition are to be used for the URLLC transmission is based at least in part on whether a number of the one or more orphaned symbols satisfies a threshold.

In a twenty-eighth aspect, alone or in combination with any one or more of the first through twenty-seventh aspects, the indication of whether one or more orphaned symbols associated with the orphaned symbol repetition are to be used for the URLLC transmission is based at least in part on whether a code rate of the orphaned symbol repetition satisfies a threshold.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a diagram illustrating an example 500 of an orphaned symbol repetition, in accordance with various aspects of the present disclosure. Orphaned symbols of a first URLLC transmission are shown by reference number 510. As shown, the first URLLC transmission involves repetitions every four symbols (denoted by alternating bottom-left-to-top-right hatching and top-left-to-bottom-right hatching). Reference number 520 shows each repetition's index. As shown, Repetition 2 (e.g., a nominal repetition) is split by a slot boundary into Repetition 2 and Repetition 3 (e.g., actual repetitions). Thus, Repetitions 2 and 3 may be considered orphaned symbol repetitions, and the symbols associated with Repetition 2 and/or Repetition 3 may be considered orphaned symbols.

Orphaned symbols of a second URLLC transmission are shown by reference number 530. As shown, the second URLLC transmission involves repetitions every four symbols starting at a tenth symbol of a slot n. Here, the second repetition of the second URLLC transmission crosses the slot boundary, and is interrupted by two downlink symbols (denoted by a dotted fill). Thus, the second repetition (e.g., a nominal repetition) may be split into a second repetition and a third repetition (e.g., actual repetitions). In this case, the first and/or last symbols of the second nominal repetition may be considered orphaned symbols.

As indicated above, FIG. 5 is provided as an example. Other examples may differ from what is described with respect to FIG. 5.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   mapping an ultra-reliable low-latency communication (URLLC) transmission to a set of symbols for uplink transmission,
      wherein the mapping of the URLLC transmission relates to a transport block size determination,
      wherein a first nominal repetition of the URLLC transmission is used to perform the transport block size determination, and
      wherein, when a second nominal repetition of the URLLC transmission is split into two or more orphaned symbol repetitions and the set of symbols is a set of discrete Fourier transform spread orthogonal frequency division multiplexing (DFT-s-OFDM) symbols, the mapping of the URLLC transmission comprises dropping an orphaned symbol repetition, of the two or more orphaned symbol repetitions, having a length of one symbol; and
   transmitting the URLLC transmission based at least in part on the mapping of the URLLC transmission.

2. The method of claim 1, wherein the mapping of the URLLC transmission further comprises postponing another orphaned symbol repetition to an available transmission window.

3. The method of claim 1, wherein a hybrid automatic repeat request (HARQ) acknowledgment (ACK) is multiplexed with a demodulation reference signal of the orphaned symbol repetition.

4. The method of claim 3, wherein a Zadoff-Chu sequence is used for the demodulation reference signal.

5. The method of claim 3, wherein the HARQ ACK is indicated using a cyclic shift of the demodulation reference signal.

6. The method of claim 3, wherein a pseudo-noise sequence is used for the demodulation reference signal.

7. The method of claim 3, wherein the HARQ ACK is indicated using a comb index of the demodulation reference signal.

8. The method of claim 1, wherein a first actual resource or a first actual repetition is used to perform the transport block size determination.

9. The method of claim 1, wherein one or more repetitions after a first repetition of the URLLC transmission are mapped with a demodulation reference symbol at a first set of symbols of the one or more repetitions.

10. The method of claim 1, wherein one or more repetitions after a first repetition of the URLLC transmission in a slot are mapped with a demodulation reference symbol at a first set of symbols of the one or more repetitions and the first repetition of the URLLC transmission in the slot is mapped with a demodulation reference signal in a third or fourth symbol of the slot when a condition is satisfied.

11. The method of claim 1, wherein all repetitions of the URLLC transmission are mapped with a demodulation reference symbol at a first set of symbols.

12. The method of claim 1, wherein the mapping of the URLLC transmission relates to a priority of an aperiodic sounding reference signal (A-SRS) of the URLLC transmission; and
wherein the A-SRS preempts or cancels an uplink shared channel associated with a best-effort service.

13. The method of claim 1, wherein the mapping of the URLLC transmission relates to a priority of an aperiodic sounding reference signal (A-SRS) of the URLLC transmission; and
wherein the A-SRS preempts or cancels an uplink shared channel in one or more conflicting symbols.

14. The method of claim 1, wherein the mapping of the URLLC transmission relates to a priority of an aperiodic sounding reference signal (A-SRS) of the URLLC transmission; and
wherein the priority of the A-SRS is explicitly indicated to the UE.

15. The method of claim 1, wherein the mapping of the URLLC transmission relates to a priority of an aperiodic sounding reference signal (A-SRS) of the URLLC transmission; and
wherein the priority of the A-SRS is explicitly indicated to the UE using downlink control information.

16. The method of claim 1, wherein the mapping of the URLLC transmission relates to a priority of an aperiodic sounding reference signal (A-SRS) of the URLLC transmission; and
wherein the priority of the A-SRS is implicitly indicated to the UE.

17. The method of claim 1, wherein the mapping of the URLLC transmission relates to a priority of an aperiodic sounding reference signal (A-SRS) of the URLLC transmission; and
wherein the priority of the A-SRS is implicitly indicated to the UE based at least in part on a timeline of downlink control information reception of the UE.

18. The method of claim 1, wherein the mapping of the URLLC transmission relates to a shared channel mapping type of a repetition of the URLLC transmission.

19. The method of claim 1, wherein a demodulation reference signal and data to be transmitted in the orphaned symbol repetition is frequency division multiplexed.

20. A user equipment (UE) for wireless communication, comprising:
a memory; and
one or more processors coupled to the memory, the one or more processors configured to:
map an ultra-reliable low-latency communication (URLLC) transmission to a set of symbols for uplink transmission,
wherein the mapping of the URLLC transmission relates to a transport block size determination,
wherein a first nominal repetition of the URLLC transmission is used to perform the transport block size determination, and
wherein, when a second nominal repetition of the URLLC transmission is split into two or more orphaned symbol repetitions and the set of symbols is a set of discrete Fourier transform spread orthogonal frequency division multiplexing (DFT-s-ODFM) symbols, the one or more processors, to map the URLLC transmission, are configured to:
drop an orphaned symbol repetition, of the two or more orphaned symbol repetitions, having a length of one symbol; and
transmit the URLLC transmission based at least in part on the mapping of the URLLC transmission.

21. The UE of claim 20, wherein a first actual resource or a first actual repetition is used to perform the transport block size determination.

22. The UE of claim 20, wherein one or more repetitions after a first repetition of the URLLC transmission are mapped with a demodulation reference symbol at a first set of symbols of the one or more repetitions.

23. The UE of claim 20, wherein one or more repetitions after a first repetition of the URLLC transmission in a slot are mapped with a demodulation reference symbol at a first set of symbols of the one or more repetitions and the first repetition of the URLLC transmission in the slot is mapped with a demodulation reference signal in a third or fourth symbol of the slot when a condition is satisfied.

24. The UE of claim 20, wherein all repetitions of the URLLC transmission are mapped with a demodulation reference symbol at a first one or more symbols.

25. The UE of claim 20, wherein the mapping of the URLLC transmission relates to a shared channel mapping type of a repetition of the URLLC transmission.

26. The UE of claim 20, wherein a demodulation reference signal and data to be transmitted in the orphaned symbol repetition is frequency division multiplexed.

27. The UE of claim 20, wherein the one or more processors, to map the URLLC transmission, are further configured to:
postpone another orphaned symbol repetition to an available transmission window.

28. The UE of claim 20, wherein a hybrid automatic repeat request (HARQ) acknowledgment (ACK) is multiplexed with a demodulation reference signal of the orphaned symbol repetition.

29. A non-transitory computer-readable medium storing a set of instructions for wireless communication, the set of instructions comprising:
one or more instructions that, when executed by one or more processors of a user equipment (UE), cause the UE to:
map an ultra-reliable low-latency communication (URLLC) transmission to a set of symbols for uplink transmission,
wherein the mapping of the URLLC transmission relates to a transport block size determination,
wherein a first nominal repetition of the URLLC transmission is used to perform the transport block size determination, and
wherein, when a second nominal repetition of the URLLC transmission is split into two or more orphaned symbol repetitions and the set of symbols is a set of discrete Fourier transform spread orthogonal frequency division multiplexing (DFT-s-OFDM) symbols, the one or more instruction, that cause the UE to map the URLLC transmission, cause the UE to:
drop an orphaned symbol repetition, of the two or more orphaned symbol repetitions, having a length of one symbol; and
transmit the URLLC transmission based at least in part on the mapping of the URLLC transmission.

30. An apparatus for wireless communication, comprising:
means for mapping an ultra-reliable low-latency communication (URLLC) transmission to a set of symbols for uplink transmission,
wherein the mapping of the the URLLC transmission relates to a transport block size determination,
wherein a first nominal repetition of the URLLC transmission is used to perform the transport block size determination, and
wherein, when a second nominal repetition is split into two or more orphaned symbol repetitions and the set of symbols is a set of discrete Fourier transform spread orthogonal frequency division multiplexing (DFT-s-ODFM) symbols, the means for mapping the URLLC transmission comprises:
means for dropping an orphaned symbol repetition, of the two or more orphaned symbol repetitions, having a length of one symbol; and
means for transmitting the URLLC transmission based at least in part on mapping the URLLC transmission.

\* \* \* \* \*